United States Patent [19]

Christian et al.

[11] 4,279,020
[45] Jul. 14, 1981

[54] POWER SUPPLY CIRCUIT FOR A DATA PROCESSOR

[75] Inventors: Ronald W. Christian; Walter G. Kutzavitch, both of Indianapolis, Ind.

[73] Assignee: Bell Telephone Laboratories, Incorporated, Murray Hill, N.J.

[21] Appl. No.: 934,817

[22] Filed: Aug. 18, 1978

[51] Int. Cl.³ .............................................. G06F 1/00
[52] U.S. Cl. ...................................... 364/900; 365/226
[58] Field of Search ... 364/200 MS File, 900 MS File; 365/226, 227, 228, 229

[56] References Cited

U.S. PATENT DOCUMENTS

| 3,535,560 | 10/1970 | Cliff | 364/200 |
|---|---|---|---|
| 3,736,569 | 5/1973 | Bouricius | 364/200 |
| 3,774,164 | 11/1973 | Osterberg | 364/200 |
| 3,855,577 | 12/1974 | Vandierendonck | 364/200 |
| 3,941,989 | 3/1976 | McLaughlin | 364/900 |
| 3,956,740 | 5/1976 | Jones et al. | 364/900 |
| 4,151,611 | 4/1979 | Sugawara | 365/229 |
| 4,158,230 | 6/1979 | Washizuka et al. | 364/708 |

OTHER PUBLICATIONS

D. Schilling, "Electronic Circuits: Discrete and Integrated", 1968, p. 63.

Primary Examiner—James D. Thomas
Assistant Examiner—David Y. Eng
Attorney, Agent, or Firm—Harry L. Newman

[57] ABSTRACT

In order to extend battery life when batteries are used and to conserve energy when commercial power is used, it is highly desirable that power not be applied to a data processor when it is not operating. A power supply in accordance with the present invention includes a power-up and supply subcircuit (100) that applies power to an associated data processor (500) when a data input circuit (700) is operated to select a particular operation of the processor. When the processor completes its operation, it provides an output signal to a power-down subcircuit (200) of the power supply which then removes power from the processor.

12 Claims, 3 Drawing Figures

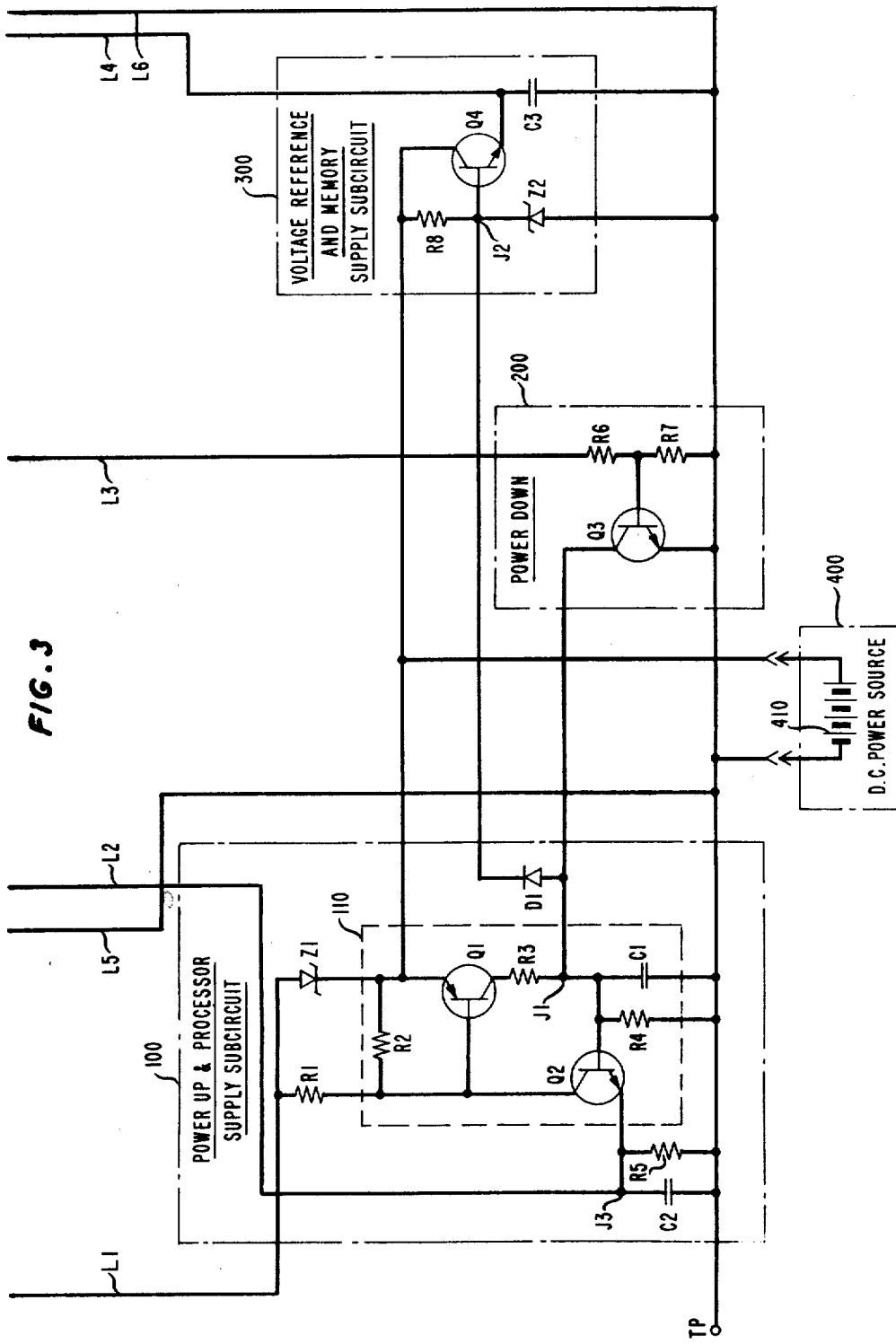

POWER SUPPLY CIRCUIT FOR A DATA PROCESSOR

Technical Field

This invention relates to the field of power supply circuits and within that field to power supply circuits for data processors such as microprocessors.

BACKGROUND OF THE INVENTION

Microprocessors are coming into increasing widespread use in many products. They are presently being used in such diverse products as calculators, microwave ovens, and automatic dialing telephones. In addition, microprocessors presently available are low power devices and therefore can be powered off of either a battery or commercial power. However, in order to extend battery life when batteries are used and to conserve energy when commercial power is used, it is highly desirable that power not be applied to the processor when it is not operating.

One common approach to dealing with this problem is to apply power to and remove power from the processor by an on/off switch. The drawback of this solution is that the user may become distracted and forget to turn the power off. Furthermore, for some users, the processor is operated on an intermittent basis. It then becomes inconvenient, if not a nuisance, to be constantly using the on/off switch to apply power to and remove power from the processor.

This problem of extending battery life and conserving energy becomes even more difficult and also more important when the processor operates in conjunction with a volatile memory in which information is stored that needs to be retained between operations of the processor. Power then needs to be continuously applied to the memory.

SUMMARY OF THE INVENTION

Applicants' inventive solution to this problem is to eliminate the on/off switch and arrange the power supply circuit so that when the processor is not in operation, the power supply applies no power to the processor, but that it powers up and applies power to the processor in response to any input to the processor that calls for operation of the processor. Furthermore, when the processor is not in operation, the power supply circuit provides sufficient power to sustain the memory, but insufficient power to operate the memory. Then when an operate input to the processor occurs, at the same time that the power supply circuit applies power to the processor, the power supply circuit increases the power provided to the memory to a level sufficient to operate the memory. When the processor has completed its operation, it provides an output to the power supply circuit. The power supply circuit responds to this output by removing power from the processor and again only providing sufficient power to the memory to sustain it.

BRIEF DESCRIPTION OF THE DRAWING

FIGS. 2 and 3 are a schematic circuit diagram of the power supply circuit and its interconnection with the data input circuit, processor, and memory.

DETAILED DESCRIPTION

Figure 1:
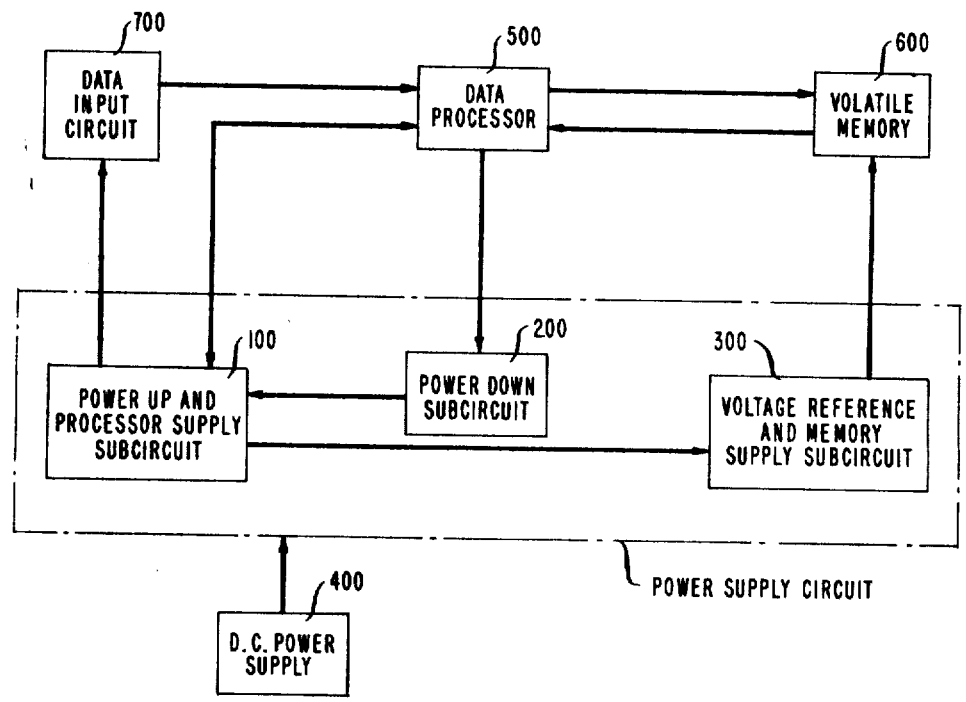
FIG. 1 is a block diagram showing the interaction of a power supply circuit in accordance with the present invention with a data input circuit, a data processor, and a volatile memory.

Referring to the block diagram of FIG. 1, a power supply circuit in accordance with the present invention includes a power up and processor supply subcircuit 100, hereinafter referred to as the processor supply subcircuit, a power down subcircuit 200, and a voltage reference and memory supply subcircuit 300, hereinafter referred to as the memory supply subcircuit. The power supply circuit is connected to a power source 400 and provides regulated d.c. voltage to a data processor 500, such as the CMOS microprocessor of Texas Instruments, Incorporated, identified as the TMS 1000NL. However, the term data processor as used herein is intended to include both stored program control and fixed logic. The power supply circuit also provides regulated d.c. voltage to a volatile memory 600, such as the CMOS random access memory of INTEL, Incorporated, identified as the 5101 L, the memory being connected to the processor 500. A data input circuit 700, such as a keyboard actuated switch array, is used to both select particular operations of the processor 500 and input information to the memory 600.

When the data processor 500 is not operating, the processor supply subcircuit 100 is in a standby state in which it provides no power to the processor. The memory supply subcircuit 300 continuously provides a constant regulated voltage to the memory 600, but when the processor supply circuit 100 is in the standby state, the memory supply subcircuit provides sufficient current to sustain the memory but not enough current to operate the memory.

Operation of the data input circuit 700 completes a path from the power source 400 through the processor supply subcircuit 100, through a path between the processor supply subcircuit and the data input circuit, through the data input circuit, through a path between the data input circuit and the data processor 500, through the data processor, and through a return path to the processor supply subcircuit. Completion of this path causes the processor supply subcircuit 100 to change to an operate state. In this state, the processor supply subcircuit 100 provides power to the data processor 500 and the return path from the data processor to the processor supply subcircuit becomes a regulated voltage supply path from the processor supply subcircuit to the data processor. The processor supply subcircuit 100, when in the operate state, also increases the current provided by the memory supply subcircuit 300 to a level sufficient to operate the memory 600. Consequently, the processor 500 can now retrieve data from and store data in the memory 600.

When the processor 500 completes its operation, it provides an output signal to the power down subcircuit 200. The power down subcircuit 200 responds to this signal by causing the processor supply subcircuit 100 to return to the standby state. Thus, it again provides no power to the processor 500 and reduces the current provided by the memory supply subcircuit 300 to a level just sufficient to maintain the memory 600.

Figure 2:
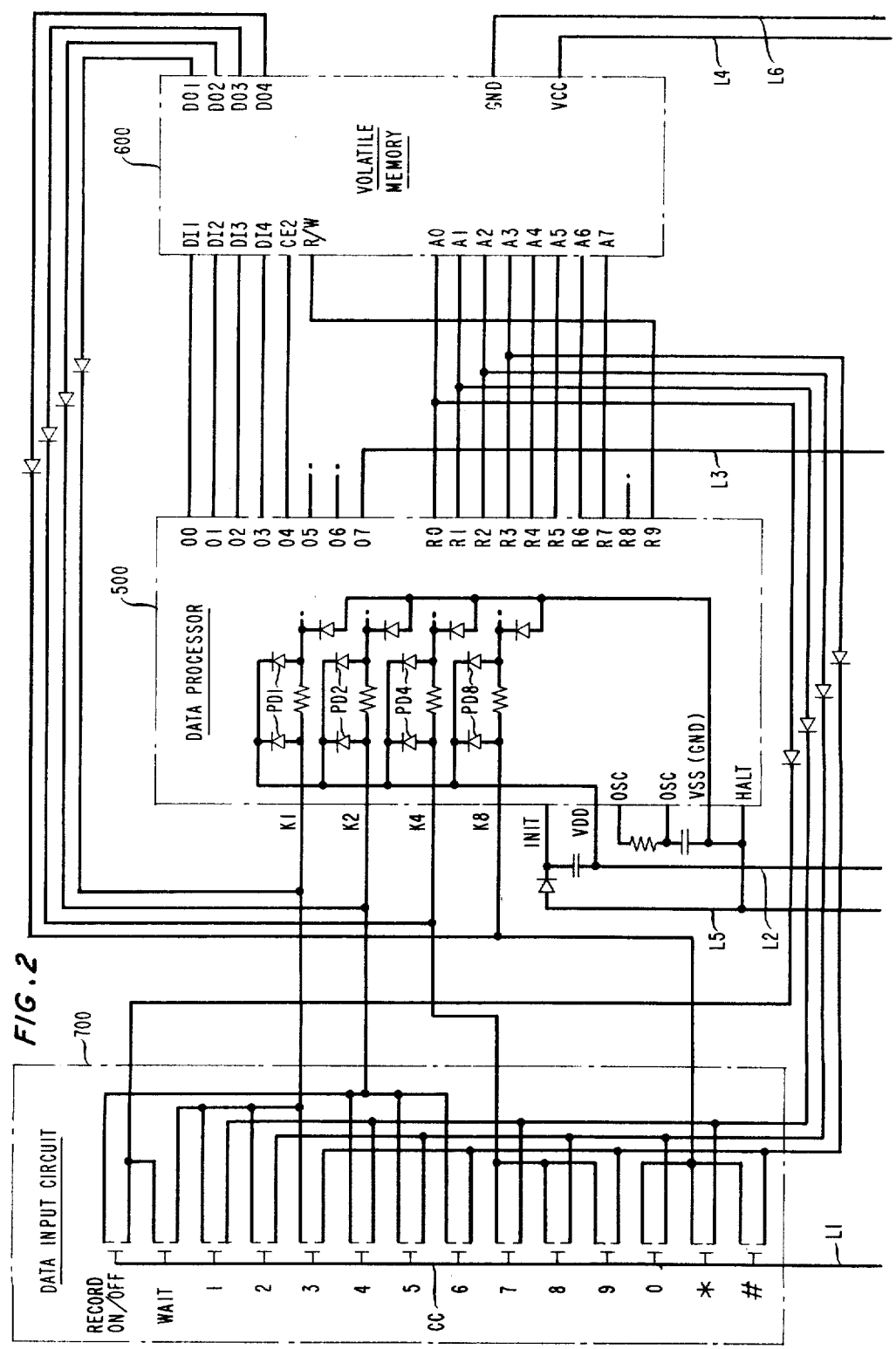

Referring now to FIGS. 2 and 3 of the drawing, the processor supply subcircuit 100 includes a latching circuit 110 comprising a pair of transistors Q1 and Q2 of opposite type. The transistor Q1, a PNP type transistor, has its emitter connected to the supply voltage potential of the power source 400. The power source 400 consists of a battery 410, and positive battery serves as the supply voltage potential while negative battery serves as the reference voltage potential.

The base of transistor Q1 is connected through a resistor R1 to a lead L1 that connects the processor supply subcircuit 100 to the data input circuit 700, and a zener diode Z1 connected between the output side of resistor R1 and the emitter of transistor Q1 provides static discharge protection from the transistor. In addition, a resistor R2 connected across the base and emitter of transistor Q1 provides a shunt path for leakage current.

The collector of transistor Q1 is connected through a resistor R3 to a junction J1. The junction J1 is connected by a diode D1 to a junction J2 of the memory supply subcircuit 300. The junction J1 is also connected to the base of transistor Q2. The base is, in turn, connected through a capacitor C1 to negative battery, a discharge resistor R4 being connected in parallel with the capacitor.

Transistor Q2, a NPN type transistor, has its collector connected to the base of transistor Q1. The emitter of transistor Q2 is connected through a junction J3 to a lead L2 that connects the processor supply subcircuit 100 to a supply voltage port $V_{DD}$ of the data processor 500. The junction J3 is also connected by a capacitor C2 to negative battery, a discharge resistor R5 being connected in parallel with this capacitor.

The power down subcircuit 200 comprises a transistor Q3 having its collector-emitter path essentially connected between junction J1 of the processor supply subcircuit 100 and negative battery. The base of transistor Q3 is connected through a resistor R6 to a lead L3 that connects the power down subcircuit 200 to an input port O7 of the data processor 500. The base of transistor Q3 is also connected by a resistor R7 to negative battery.

The memory supply subcircuit 300 comprises a current limiting resistor R8 connected in series with a zener diode Z2 across the battery 410. The diode Z2 serves as the voltage reference for the power supply circuit, and the base of a transistor Q4 is connected to the junction J2 between the resistor R8 and the diode. The collector of Q4 is connected to positive battery while the emitter of Q4 is connected to a lead L4 that connects the memory supply subcircuit 300 to a supply voltage port $V_{CC}$ of the memory 600. The emitter of transistor Q4 is also connected by a storage capacitor C3 to negative battery.

The data processor 500 includes a plurality of input ports identified as K1, K2, K4 and K8 that are respectfully connected by individual input protection diode pairs PD1, PD2, PD4, and PD8 to the supply voltage port $V_{DD}$. The processor 500 also includes reference voltage port $V_{SS}$ connected by a lead L5 to negative battery of the power supply circuit. Aside from the output port O7 referred to above, the other ports of the processor 500, which interconnect with ports of the memory 600 and with the data input circuit 700, are not of interest with respect to the present invention and therefore need not be further described. Similarly, the only ports of interest in the memory 600 are the supply voltage port $V_{CC}$ previously mentioned and a reference voltage port GND which is connected by a lead L6 to negative battery of the power supply circuit.

The data input circuit 700 comprises a keyboard operated switch array having a common conductive path CC connected to the lead L1. Operation of the keyboard results in the common conductive path CC being moved into engagement with an individual pair of contacts to complete a conductive path between the contacts. One contact of each pair of contacts is connected to one of the input ports K1-K8 of the data processor 500. The other contact of each pair of contacts is connected to other ports of the processor.

DESCRIPTION OF OPERATION

When the processor 500 is not operating, the processor supply subcircuit 100 is in the standby state in that Q1 and Q2 are turned off and consequently no power is applied to the processor. Power is however applied to the memory 600 by transistor Q4 which remains on all the time that the battery 410 is connected to the power supply circuit. The transistor Q4 serves as a simple series transistor regulator with zener diode Z2 as a voltage reference of the regulator, and the emitter of transistor Q4 provides the regulated supply output to the supply voltage port $V_{CC}$ of the memory 600 via lead L4. The zener diode Z2 advantageously provides a reference voltage that is high relative to the voltage necessary to sustain the memory 600. Consequently, when it is necessary to replace the battery 410, the charge on storage capacitor C3 is then sufficient to sustain the memory for the period of time that it takes to install a new battery. However, the resistor R8 is selected to have a very high resistance and thereby provide a very high impedance across the base and collector of transistor Q4. As a result, only the level of current needed to prevent loss of data stored in the memory 600 is applied. In addition, diode D1 isolated the memory supply subcircuit 300 from the processor supply subcircuit 100. It is therefore seen that very little power is consumed when the processor 500 is not operating.

With the processor supply subcircuit 100 in the standby state, the operation of the data input circuit 700 initiates the operation of the processor 500. The engagement of the common conductive path CC with any of the associated pairs of contacts completes a path from the lead L1 to one of the input ports K1-K8 of the processor 500. As described above, the emitter of transistor Q1 is connected to positive battery, and the base of transistor Q1 is connected through resistor R1 to the lead L1. In addition, each of the input ports K1-K8 is connected by an associated input protection diode pair PD1-PD8 to the supply voltage port $V_{DD}$ of the processor 500. Finally, the supply voltage port $V_{DD}$ is connected via lead L2 to the junction J3 which is connected by capacitor C2 to negative battery.

Since capacitor C2 is in a discharged condition when the processor supply subcircuit 100 is in the standby state, the junction J3 is essentially at negative battery potential and capacitor C2 starts to charge, drawing base current from transistor Q1. This base current results in the flow of collector current in transistor Q1 which charges capacitor C1 and is fed into the base of transistor Q2 when the base voltage is reached. Transistor Q2 is therefore driven to turn on and it then draws base current out of transistor Q1, turning transistor Q1 on harder. This increases the collector current of transistor Q1 which in turn drives transistor Q2 on harder. Thus, it is seen that transistors Q1 and Q2 provided a latching circuit 110 that is activated by a small flow of base current in transistor Q1 and, in turning on, changes the processor supply subcircuit 100 from the standby state to an operate state.

The emitter current of transistor Q2 charges capacitor C2 and, because of the gradual turn on of the transistor, the capacitor C2 is charged in a manner that provides a highly desirable, very smooth voltage rise ramp to the supply voltage port $V_{DD}$ of the processor 500. At the same time, the turning on of transistor Q1 connects resistor R3 and diode D1 in parallel with resistor R8 of the memory supply subcircuit 300. The resistor R3 is selected to have a very low resistance, and therefore the impedance across the collector and base of transistor Q4 is greatly reduced. Consequently, the current provided by transistor Q4 to the memory 600 is increased to the level necessary for its operation.

When a charge on capacitor C2 reaches the turn on voltage of the processor 500, the processor starts operating and responds to the contact closure in the data input circuit 700. Furthermore, when the contacts in the data input circuit 700 are subsequently released, because the latching circuit 110 is turned on, the processor supply subcircuit 100 continues to provide power to the processor 500. The capacitor C1 prevents any negative going transients generated by the battery 410 from turning off the latching circuit 110.

Zener diode Z2, which serves as the voltage reference for the memory supply subcircuit 300, also serves in combination with the diode D1 as the voltage reference for the processor supply subcircuit 100. Thus, the regulated voltage provided by the emitter of transistor Q2 to the processor 500 is close to the regulated voltage provided by the emitter of Q4 to the memory 600. In addition to eliminating the possibility of a latch-up condition occurring between the processor and memory, the expense of an additional voltage reference zener diode and matching of tolerances is avoided.

When the data processor 500 completes its operation, it provides a high output at output port O7 which is applied through the lead L3 and resistor R6 to the base of transistor Q3 of the power down subcircuit 200. Transistor Q3 is thereby turned on and, because it connects the base of transistor Q2 to negative battery, it turns transistor Q2 off and discharges capacitor C1. When transistor Q2 is turned off and the data input circuit 700 is not operated, transistor Q1 is starved for base current and so it, too, is turned off. The processor supply subcircuit 100 is thereby returned to the standby state and shunting resistor R3 is removed from across resistor R8 of the memory supply subcircuit 300 whereby the current provided to the memory 600 is again reduced to a level just sufficient to sustain the memory.

In addition, the supply voltage to the data processor 500 begins to fall at a rate determined by the processor current drain and the value of capacitor C2. The output port O7 remains high as long as the supply voltage remains above the minimum needed to operate the processor 500, and, thus, the charge on capacitor C2 smoothly falls to that level. Thereafter, the capacitor C2 is discharged through the resistor R5 to return the junction J3 to essentially negative battery potential. Similarly, while the processor supply subcircuit 100 is in the standby state, resistor R4 assures that no charge builds up on capacitor C1 as a result of leakage current.

We claim:

1. A power supply circuit for a data processor to which a data input circuit is connected, operation of the data input circuit providing an input to the data processor, the power supply circuit including a power up circuit that is latched on responsive to the operation of the data input circuit and when latched on supplies power from a power source to the processor, the power up circuit comprising a single pair of complementary transistors arranged so that an output electrode of each transistor is connected to an input electrode of the other transistor, a first of the transistors having its third electrode adapted to be connected to the power source, and the second transistor having its third electrode connected to the power input of the data processor, the operation of the data input circuit completing a path from the input electrode of the first transistor to a point that is essentially at a common reference potential to latch the power up circuit on.

2. A power supply circuit as in claim 1 wherein the power up circuit comprises a pair of bipolar transistors, the collector of each transistor being connected to the base of the other transistor, a first of the transistors having its emitter adapted to be connected to the power source and its base connected to the data input circuit and the second transistor having its emitter connected to a point that is essentially at the common reference potential when the power up circuit is turned off, the emitter of the second transistor providing power for the processor when the power up circuit is turned on.

3. A power supply circuit as in claim 2 wherein the data input circuit comprises a keyboard operated switch array, the operation of any keyboard switch completing a conductive path from the base of the first transistor to a selected input port of the processor and through the processor to the point that is essentially at the common reference potential when the power up circuit is turned off.

4. A power supply circuit as in claim 3 wherein the path through the processor extends from the input port through an input protection diode connected to the input port and out a supply voltage port.

5. A power supply as in claim 2 further including a power down circuit comprising a third transistor having its collector-emitter path connected between the collector of the first transistor and the common reference potential, the base of the third transistor being connected to a port of the processor that provides an output indicating that the processor has completed its operation, the third transistor when turned on turning off the second transistor and thereby turning off the first transistor whereby power is removed from the processor.

6. A power supply circuit as in claim 2 further including a circuit for providing power to a volatile memory operating in conjunction with the processor, the memory power circuit comprising a series connected current limiting resistor and voltage reference zener diode adapted to be connected across the power source, and a third transistor having its base connected to the junction between the current limiting resistor and the diode and having its collector-emitter path connected between the other side of the resistor and a supply voltage port of the memory, the first transistor connecting a low resistance resistor in shunt with the current limiting resistor when the power up circuit is turned on.

7. A power supply circuit as in claim 6 further including a power down circuit comprising a fourth transistor having its collector-emitter path connected between the collector of the first transistor and the reference potential of the power source, the base of the fourth transistor being connected to a port of the processor that provides an output indicating that the processor has completed its operation, the fourth transistor when turned on, turning off the second transistor and thereby the first transistor whereby power is removed from the processor and the shunt resistor is removed from across the current limiting resistor to reduce the current provided to the memory.

8. A power supply circuit as in claim 11 wherein the memory supply subcircuit continuously provides a constant regulated voltage to the memory, the memory supply subcircuit providing just sufficient current to sustain the memory but not enough current to operate the memory when the processor supply subcircuit is in the standby state, the processor supply subcircuit when in the operate state increasing the current provided by the memory supply subcircuit to a level to enable operation of the memory.

9. A power supply circuit as in claim 8 wherein the memory supply subcircuit includes a current limiting element and voltage reference element connected in series and adapted to be connected across the power source, the memory supply subcircuit further including a transistor having its base connected to a junction between the current limiting element and the voltage reference element and having its collector-emitter path connected between the other side of the current limiting element and a supply voltage port of the memory.

10. A power supply circuit as in claim 9 wherein the processor supply subcircuit when in the operate state shunts the current limiting element of the memory supply subcircuit.

11. A power supply circuit having a data processor and volatile memory, the power supply circuit including a subcircuit for supplying power to the memory, the memory supply subcircuit providing sufficient power to sustain the memory but not enough power to operate the memory when the processor is not in operation, and a subcircuit for supplying power to the processor, the processor supply subcircuit providing no power to the processor when the processor is not in operation, the processor supply subcircuit being responsive to an input to the processor for providing power to the processor and for increasing the power supplied by the memory supply subcircuit to a level sufficient to operate the memory.

12. A power supply circuit as in claim 11 further including a power down subcircuit responsive to an output from the processor indicating the completion of its operation for causing the processor supply subcircuit to remove power from the processor and returning the memory supply subcircuit to providing just sufficient power to sustain the memory.

* * * * *

UNITED STATES PATENT AND TRADEMARK OFFICE
CERTIFICATE OF CORRECTION

PATENT NO. : 4,279,020

DATED : July 14, 1981

INVENTOR(S) : Ronald W. Christian and Walter G. Kutzavitch

It is certified that error appears in the above—identified patent and that said Letters Patent is hereby corrected as shown below:

Column 1, line 27, "users" should read --uses--.
Column 3, line 10, "from" should read --for--; line 35, "input" should read --output--. Column 4, line 33, "isolated" should read --isolates--.

Signed and Sealed this

Tenth Day of November 1981

[SEAL]

Attest:

GERALD J. MOSSINGHOFF

Attesting Officer    Commissioner of Patents and Trademarks